Aug. 10, 1943.     R. C. SNYDER     2,326,403
METHOD OF AND APPARATUS FOR HARD FACING
Filed Oct. 11, 1941     2 Sheets-Sheet 1
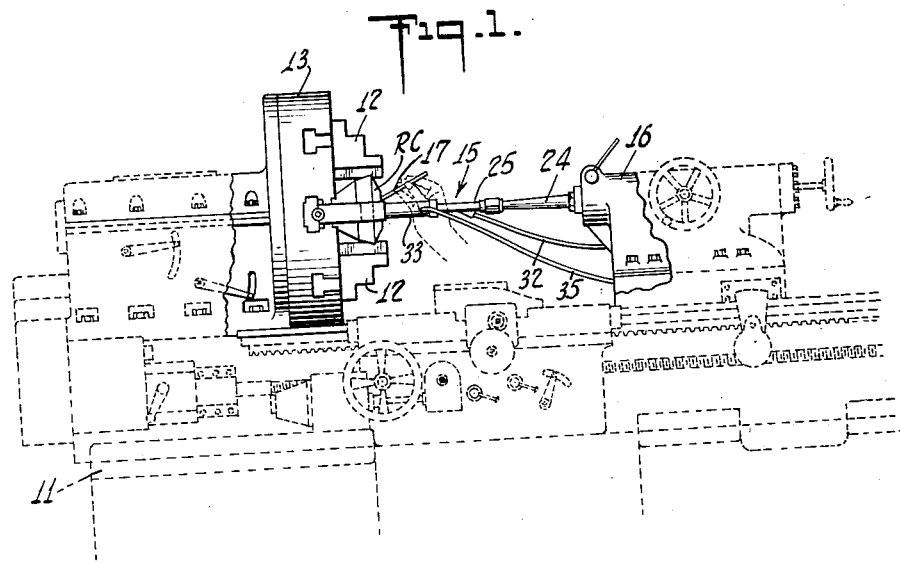
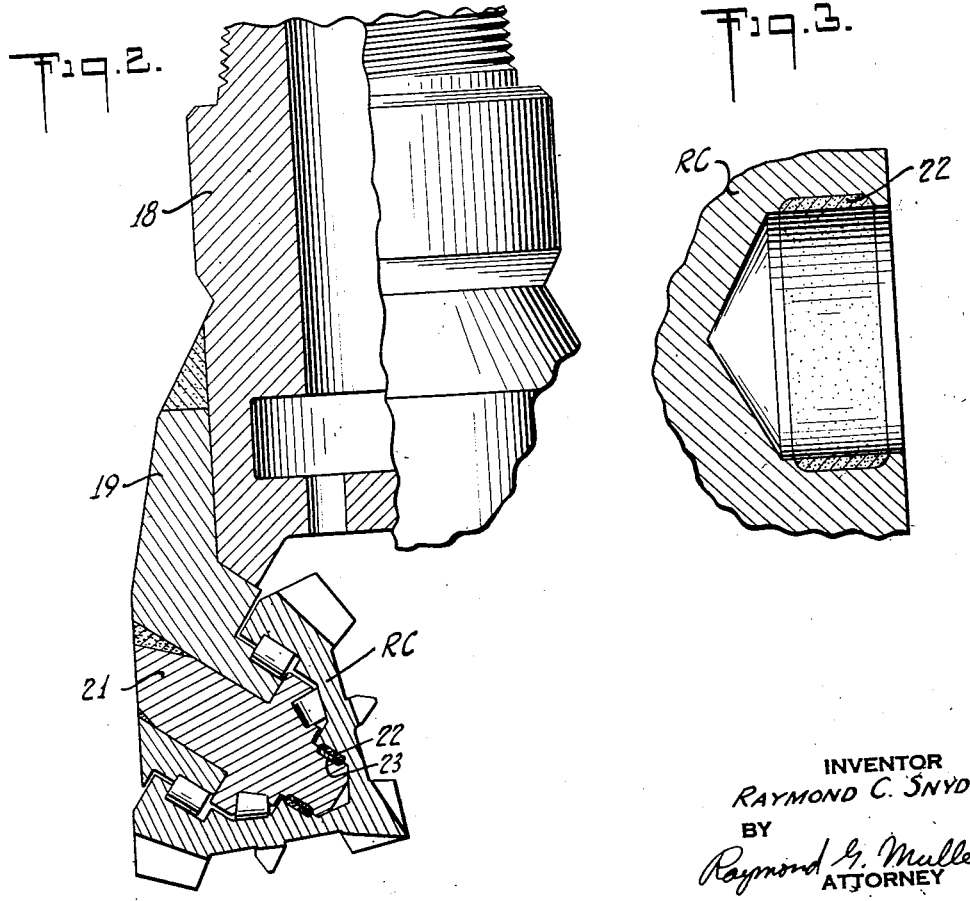
INVENTOR
RAYMOND C. SNYDER.
BY
Raymond G. Mullee
ATTORNEY

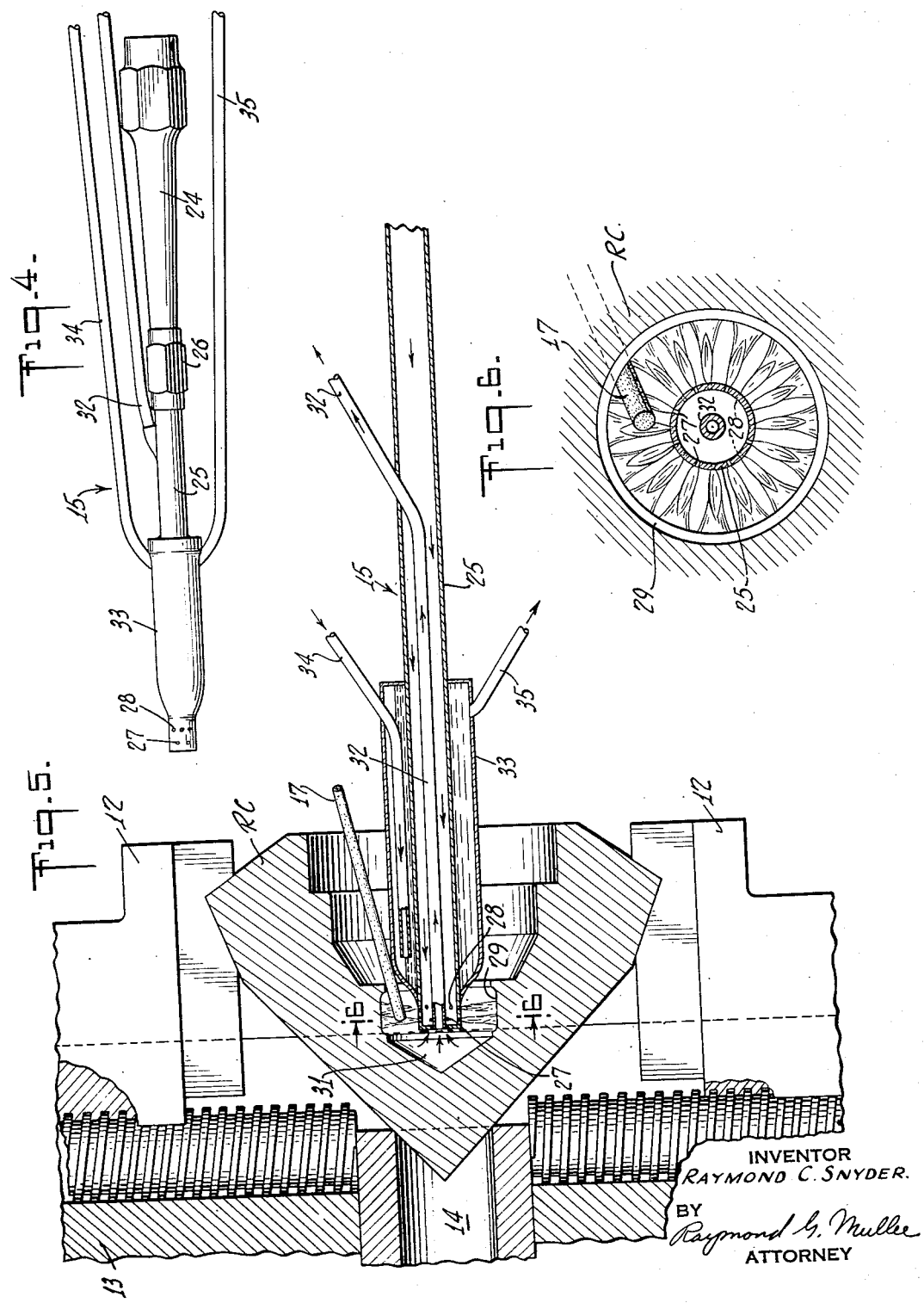

Patented Aug. 10, 1943

2,326,403

UNITED STATES PATENT OFFICE 2,326,403

METHOD OF AND APPARATUS FOR HARD FACING

Raymond C. Snyder, Franklin, Pa., assignor to Chicago Pneumatic Tool Company, New York, N. Y., a corporation of New Jersey Application October 11, 1941, Serial No. 414,562

7 Claims. (Cl. 117—46)

This invention relates to a method of heat treating internal walls of metal objects, and to apparatus for carrying out the method. The invention has special reference to roller cutters used in deep well drilling bit assemblies, a particular application of the invention lying in the formation of a hard-face bearing surface on the internal wall of such a cutter.

A roller cutter of the class described has a generally conical shape and rotates on a bearing shaft which extends into the cutter through a bore or recess opening through the base thereof. It is desirable to provide hardened friction bearing surfaces on the concave inner surface of the cutter in order to prolong its useful life. However, no means nor method of a practical nature heretofore has been devised for this purpose, the difficulty being due, in part, to the lack of any means for venting burned gases from the cutter bore during the hard-facing process. Because of this lack the heating torch cannot be kept in constant operation since the burned gases accumulate in front of the torch. The presence of these gases interferes with combustion and prevents the flame from being maintained long enough to cause perfect fusing of the hard-facing material in the cutter bore. Another problem resides in the tendency, in the absence of a suitable venting means, of the streams of gas to blow away the layer of hard-facing material being deposited in the cutter bore. Consequently, it has been the practice to use pre-hardened bushings in the cutter bore although such use adds materially to the cost of the bit assembly. The present invention eliminates the necessity for separate bushings within the cutter bore.

To reduce the cost of a bit assembly in this manner is, therefore, one object of the invention. Another object is to make possible direct heat treating and hard-facing of annular areas on the internal walls of roller cutters and like objects.

A further object is to permit continuous operation of a heat treating torch within the confines of a bore by venting continuously the area of the bore in advance of the torch and by cooling continuously the burner end of the torch.

According to the method of the invention a hard-face bearing is formed on the internal wall of a roller cutter by mounting the cutter and a heating torch in relatively rotatable fixtures on a machine tool, with the burner end of the torch extending into the cutter bore; discharging the gases from the burner end through a series of circumferential radial ports therein, thereby to form flame jets heating the wall of the bore along an annular path of predetermined position; depositing in such path particles of hard-facing material; and venting through the torch the area defined by the bottom of the bore and said flame jets. The apparatus of the invention includes a novel heating torch extension which constitutes the burner end of the torch and embodies a venting tube longitudinally disposed within the extension and a jacket surrounding the extension through which water or other cooling fluid is circulated.

Other objects and details of the invention will be apparent from the following description when read in conjunction with the accompanying drawings, wherein:

Fig. 1 is a fragmentary view, in side elevation, of a machine tool in which a roller cutter and the heating torch of the invention are mounted in relatively rotatable fixtures and in working relation, this view showing also the manner in which the particles of hard-facing material are deposited within the cutter;

Fig. 2 is a fragmentary view, partly in side elevation and partly in longitudinal section, of a drill bit assembly in which hard-face bearings of the kind produced by the present invention are formed in the roller cutters;

Fig. 3 is a fragmentary detail view, in longitudinal section, of a roller cutter embodying a finished bearing surface of the kind produced by the present method;

Fig. 4 is a view, in elevation, of the heating torch of the present invention;

Fig. 5 is a diagrammatic view, in longitudinal section, of a roller cutter, a portion of the mounting therefor, and the heating torch extending into the cutter, the several parts being shown in operation during the process of applying a hard-face bearing to the internal wall of the cutter; and Fig. 6 is a view, in cross section, through the cutter and torch tip, being taken substantially along the line 6—6 of Fig. 5 and enlarged relatively thereto.

Referring to Fig. 1, a lathe 11 of known construction is shown supporting a rock bit roller cutter and a heating torch of the present invention, mounted thereon in cooperative working relation. The cutter, indicated at RC and shown in an unfinished condition, is gripped between the jaws 12 of a rotatable chuck 13. The apex of the cutter is seated in the open end of a tubular stop 14 (see Fig. 5) within the chuck. The cutter base faces the torch, indicated generally at 15, and the tail stock 16 within which the torch is mounted. The cutter bore, opening through the base thereof, receives the burner end of the torch 15. With the cutter and torch so arranged rotation of the chuck 13 enforces a similar motion of the cutter which thus turns relatively to the torch about the burner end thereof. The torch is rigidly secured in the tail stock 16, and, when set in operation, directs jets of flame against the inner periphery of the rotating cutter along an annular path of predetermined position. As shown in Fig. 1, a rod 17, composed essentially of crushed tungsten carbide or other material having the property of extreme hardness and a suitable cementing agent of lower melting point such as cobalt, is inserted by hand into the cutter bore and into the torch flame therein. The intense heat of the flame melts the binder and disintegrates the rod, and the particles thereof are carried by the flame jets to the surrounding wall of the cutter where they are deposited and fused to the cutter bore. A hard-facing material known commercially as Stellite is manufactured in stick form, and such a stick, or its equivalent, is best suited for the use ascribed to the rod 17.

While the torch 15 may be adjusted relatively to the cutter to apply the flame at any point within the internal bore, the present disclosure is concerned with the nose of the cutter where a friction bearing is customarily provided between the cutter and the spindle shaft upon which it rotates. Referring to Fig. 2, a conventional well drilling rock bit comprises a rotatable bit head 18 having two or more downwardly extending spindle shanks 19 (one shown) which in turn are provided with shafts 21 inclined inwardly and downwardly toward the longitudinal axis of the bit head. Upon the spindle shaft 21 a finished roller cutter RC is rotatably mounted. The bit assembly rests in the drill hole and is given a positive rotary drive causing the cutters thereon to roll around the bottom of the hole, and, by reason of their toothed exteriors, break up the earth formation. The weight of thousands of feet of drill stem above the bit assembly sets up opposing thrusts of great magnitude which are borne by rolling the friction bearings between the cutter and spindle shaft 21. The nose of the cutter is not ordinarily adapted to receive rolling bearings and heretofore it has been the practice to insert therein a bushing, the inner periphery of which has been conditioned for wear resistance. The annular surface on the inner end of the spindle shaft is similarly conditioned and cooperates with the inner periphery of the bushing to form a friction bearing of relatively long life. The present invention contemplates the provision of a similar bearing, but, by treating the inner surface of the cutter directly, renders the separate hardened bushing of the prior art unnecessary. Thus, as shown in Fig. 2, a bearing is produced which consists of opposing layers 22 and 23 of hard-facing material embedded in respective oppositely disposed grooves in the cutter RC and spindle shaft 21. The convex bearing surface 23 may be formed in any conventional manner, while its complementary concave surface 22 is produced by the present novel process.

Turning now to a more detailed consideration of the torch 15 and the manner in which it is used to treat an annular surface on the wall of a cutter bore, it will be noted that the torch comprises a tubular body 24, adapted to be removably secured in the tail stock 13, and an extension 25 aligned with the body 24 and connected thereto by a coupling 26. The combustible mixture of gases is supplied to the torch through the body 24 (in a manner not here shown) and, while under relatively high pressure, is directed to the closed front end of extension 25. Two series of radial ports 27 and 28 are formed in extension 25, near its front end, and the gas is discharged through these ports in a plurality of circumferential jets, each of which forms a separate flame when ignited (see Figs. 5 and 6). The forward end of the torch is illustrated diagrammatically in Fig. 5. There the burner end is shown within the cutter, in working position, with the ports 27 and 28 opposite an annular groove 29 in the internal wall of the cutter. The torch is shown in operation, with the tip of the Stellite rod 17 inserted in the torch flames, the parts being shown in the process of forming a bearing surface like that indicated at 22 in Fig. 2. The series of ports 27 and 28 are longitudinally spaced from one another and extend around the entire circumference of the torch tip, each series being offset or staggered with respect to the other. Thus, substantially all the surface of the groove 29 is subjected simultaneously to the action of the flames, and the metal within the groove accordingly is heated evenly in each degree of rotation of the cutter. With the torch in operation, and the cutter slowly rotating, the rod 17 is held with its inner end within the flames issuing from ports 27 and 28. As the cementing agent which binds the hard-facing material together is melted, droplets in the form of small, hard particles are carried into the groove 29 by the flames. The metal defining the groove 29 is heated preparatory to introducing the Stellite rod into the bore and assumes a semi-fluid state permitting the hard particles easily to become embedded in the groove. Operation of the chuck 13, torch 15, and manual application of the rod 17 is continued until the groove 29 is filled with an even layer of Stellite. The completed hard-face bearing surface is shown in Fig. 3.

The formation of the bearing surface within the cutter bore is necessarily completed in one continuous operation since any interruption in the application of the flame results in imperfect fusing of the Stellite. However, this is accomplished only by overcoming certain problems created by operation of an acetylene torch within the confines of a cutter bore. The most serious of these problems arises from the fact that the flame jets exercise a substantial restriction upon the escape of air from the area at the bottom of the bore, in front of the torch. The flames in effect define a chamber, indicated at 31 in Fig. 5, in which the burned gases will, unless vented, accumulate and finally attain a pressure sufficient to blow any unset metal and hard-facing particles out of the bore. The problem so presented is overcome in the method of this invention by venting the chamber 31 through a tube 32 which enters the torch extension 25 near the rear end thereof and is arranged longitudinally within the extension. The front end of the tube is passed through a central opening in the closed tip of the torch extension, and the opposite or exhaust end of the tube may terminate in any convenient location outside the torch. The tube is open throughout its length. In this manner the chamber 31 is connected constantly to exhaust, the burned gases being free to pass from the chamber into the tube 32 and thence to atmosphere.

Continuous operation of the torch causes excessive heating of the burner end thereof. Thus, another problem is presented which has been met by surrounding the major portion of the torch extension 25 with a water jacket 33. Inlet and outlet tubes 34 and 35 communicate with the interior of the jacket 33 and act respectively to conduct water to the torch and to return the water to its source. A suitable pump mechanism (not shown) may be provided to effect a steady circulation of cooling water through the jacket 33 during operation of the torch.

It will be evident that neither the method nor the apparatus here disclosed is limited in its use to a process of applying hard-facing to the bores of roller cutters but is applicable generally to problems of heat treating in internal bores.

What is claimed is:

1. A method of forming a bearing surface of hard-facing material on the internal wall of a roller cutter, which method comprises: supporting the cutter and a heating torch for relative rotational movement with the burner end of the torch extending into the cutter bore; rotating said cutter about said burner end; discharging the gases from said torch through radial outlets in the burner end, thereby to form flame jets which heat the wall of the bore along an annular path opposite said radial outlets; and holding in said flame jets a rod composed of hard-facing particles and a suitable binding agent, the binding agent being melted by the heat of said flames and the hard-facing particles deposited in the wall of said bore in the area of said annular path.

2. A method of forming a bearing surface of hard-facing material on the internal wall of a roller cutter, which method comprises; supporting the cutter and a heating torch for relative rotational movement with the burner end of the torch extending inside the cutter bore; discharging the gases from said burner end in a direction at right angles to the longitudinal axis of the torch, thereby to form radial flame jets which heat the wall of the cutter along an annular path of predetermined width and position; depositing in such annular path particles of hard-facing material; and venting through the torch the area defined by the bottom of said bore and said radial flame jets.

3. A method of forming a bearing surface of hard-facing material on the internal wall of a roller cutter, which method comprises; supporting the cutter and a heating torch for relative rotational movement with the burner end of the torch extending inside the cutter bore; discharging the gases from said burner end through a series of radial outlets rearwardly of the torch tip, thereby to form flame jets which heat the wall of the bore along an annular path of predetermined position; depositing in such annular path particles of hard-facing material; and venting the area defined by the bottom of said bore and said flame jets by means of a passage extending longitudinally within the burner end of said torch and opening through the torch tip at a point in advance of said radial outlets.

4. A heat treating torch having a tubular end portion receiving the combustible gases and closed at its outer extremity; radial discharge ports in said tubular end portion rearward of the outer extremity thereof; and a venting passage extending longitudinally within said tubular end portion and connected at either end to atmosphere, one end of said passage opening through said tubular end portion at a point rearward of said radial ports and the other end of said passage opening through said end portion at a point in advance of said radial ports.

5. A heating torch especially adapted for use in treating internal walls in bores, recesses and like openings, comprising a tubular end portion receiving the combustible gases and closed at its outer extremity; radial discharge ports in said tubular end portion rearward of the outer extremity thereof; and a vent in said tubular end portion for burned gases trapped in front of the torch, said vent having the form of a passage closed against communication with the interior of said tubular end portion and extending from a point in advance of said radial ports to a point rearward of said ports.

6. A heating torch especially adapted for use in treating internal walls in bores closed at their inner ends, comprising a tubular burner portion closed at its front end and adapted to be inserted into the bore, means for supplying fresh fuel gases to said burner portion, radial ports in the outer wall of said burner portion through which the fuel gas is discharged as flame jets against an annular surface on the wall of said bore, and an inner passage within said tubular burner portion opening through said burner portion in advance of said radial ports for venting the area defined by the closed end of said bore and said flame jets.

7. A heating torch according to claim 6, characterized in that said inner passage is constructed as a tube entering the torch rearward of said radial ports and extending through said burner portion and out the front end thereof, said tube being open throughout its length to permit trapped gases within the bore to escape to atmosphere.

RAYMOND C. SNYDER.